United States Patent [19]

Cichanowski

[11] Patent Number: 4,800,114

[45] Date of Patent: Jan. 24, 1989

[54] FIBER AND RESIN CONSTRUCTION

[76] Inventor: Michael F. Cichanowski, Box 247, Winona, Minn. 55987

[21] Appl. No.: 214,059

[22] Filed: Jun. 30, 1988

Related U.S. Application Data

[63] Continuation-in-part of Ser. No. 896,833, Aug. 15, 1986, abandoned, and a continuation-in-part of Ser. No. 90,598, Aug. 28, 1987.

[51] Int. Cl.$^4$ .......................... B32B 1/00; B32B 3/00
[52] U.S. Cl. .................................. 428/175; 428/228; 428/251; 428/259; 428/268; 428/273
[58] Field of Search ............... 428/175, 259, 228, 251, 428/268, 273

[56] References Cited

U.S. PATENT DOCUMENTS

| | | | |
|---|---|---|---|
| 4,103,102 | 7/1978 | Klein | 428/268 |
| 4,282,011 | 8/1981 | Terpay | 428/259 |
| 4,414,264 | 11/1983 | Olson | 428/259 |

Primary Examiner—Marion C. McCamish
Attorney, Agent, or Firm—Douglas B. White

[57] ABSTRACT

There is provided a fiber and resin construction wherein yarns of polyester fibers are interweaved with yarns of fiberglass fibers to form a composite fabric. This fabric is then fitted within a mold and soaked with resin. The formed fabric and resin composition is allowed to harden within the mold.

6 Claims, 2 Drawing Sheets

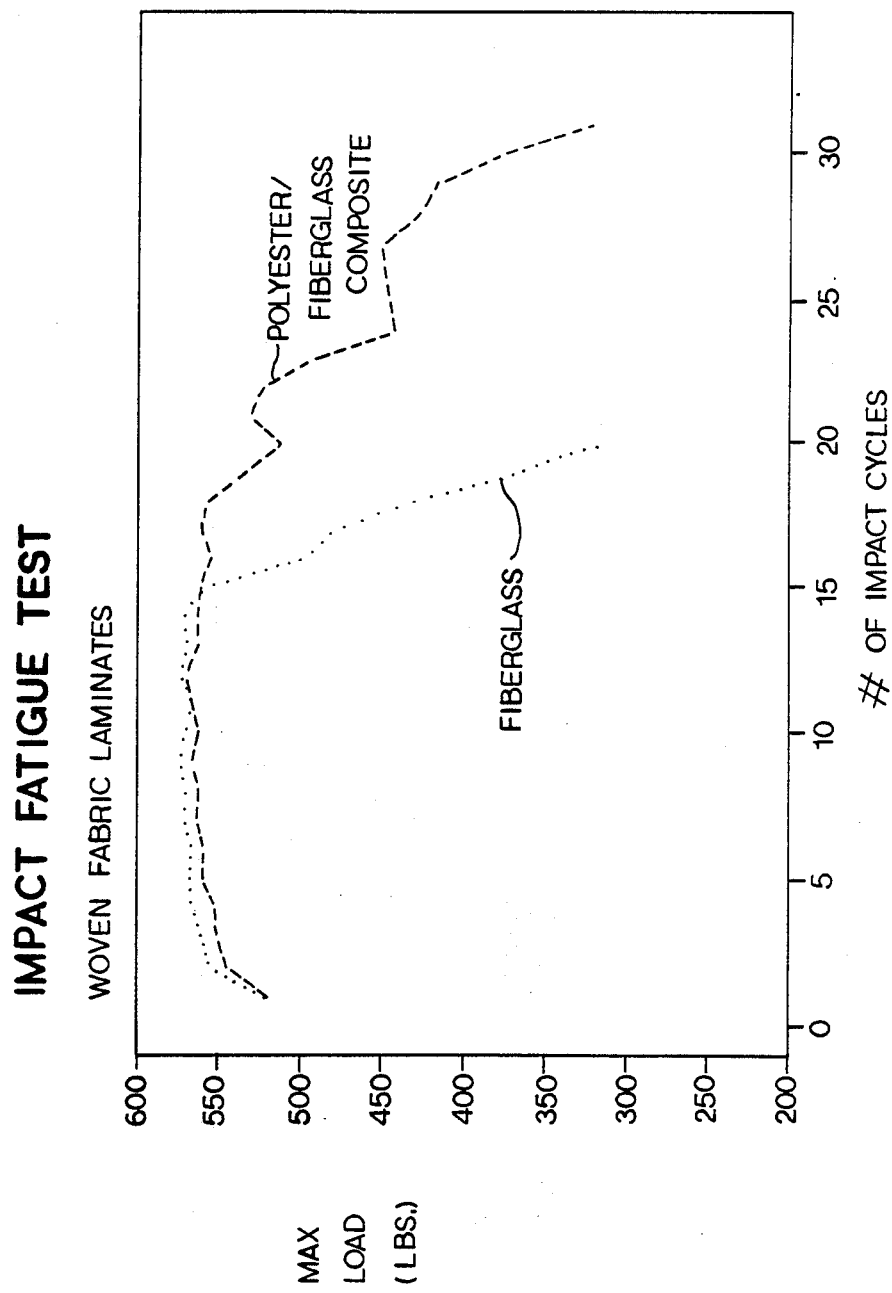

ns4,800,114

FIBER AND RESIN CONSTRUCTION

This is a continuation-in-part of application Ser. No. 896,833 filed Aug. 15, 1986, now abandoned, and a continuation-in-part of application Ser. No. 090,598 filed Aug. 28, 1987.

FIELD OF THE INVENTION

The present invention relates generally to fiber and resin construction and more particularly to an improved fabric fro use as a lamina in laminate construction. Specifically, the composite construction of the present invention was developed for use in the fiberglass molding of boats.

BACKGROUND OF THE INVENTION

Boats, and particularly canoes, have been made of a construction of fiberglass and resins. The fiberglass is formed into yarns and woven into a fabric. The construction procedure generally embodies placing a fiberglass fabric into a mold where it is wetted with resin and allowed to harden. The hardened produce may then be removed from the mold, finished and placed into service. Typical fiberglass construction is known to be relatively brittle and will break with repeated impact loads. Prior methods developed to strengthen the produce have generally involved creating a laminate composed of a combination of multiple layers of fiberglass, Kevlar or plastic foam. Prior attempts to utilize nylon or polyester fibers have produced fabrics which have been extremely difficult to work with and, more importantly, have delaminated in use.

SUMMARY OF THE INVENTION

It is accordingly an object of the present invention to provide a fiber and resin construction and process which is more durable and impact resistant than prior fiber and resin constructions and lighter than laminates or similar strength.

Generally there is provided a product and process of manufacture for curved panels or boat hulls wherein yarns of polyester fibers are interweaved with yarns of fiberglass fibers to form a composite fabric. This fabric is then fitted within a mold, with the polyester fibers extending longitudinally of the hull and the fiberglass fibers extending transversely, where it is soaked with resin and allowed to harden. Notwithstanding the seemingly stiff hardened resin, the use of polyester yarns facilitates limited resilient yielding along the longitudinal direction and thereby prevents fiber breakage. Accordingly, the fabric, and particularly the polyester yarns, may be oriented to provide limited stretch in one direction while retaining stiffness in a second direction.

The interweaved combination of the polyester and fiberglass yarns yields a fabric which is easy to work with in the molding process and may be used in combination with all fiberglass cloths in a laminate. Moreover, due to the interweaving of the fiberglass and polyester, delamination does not occur.

While the fiber and resin composition functions well in a flat sheet by providing greater yield in one direction, there is further provided a process and product whereby the composition is formed in a curved panel like a boat hull to enhance its properties. The fiberglass fibers are arranged transversely as curved ribs in the panel or hull and the polyester fibers are arranged longitudinally to provide a longitudinally flexible but transversely stiff panel.

Generally there is provided herein a stiff panel structure of fiber and resin construction comprising: a panel of fabric arranged to exhibit a curved contour and having a plurality of glass yarns and a plurality of yarns of organic composition aligned substantially transverse to said glass yarns and interweaved therewith; and a hardenable resinous composition arranged to encompass said yarns to yield a hardened unified stiff panel structure.

Other objects and advantages of the invention will become apparent upon reading the detailed description.

BRIEF DESCRIPTION OF THE DRAWINGS

FIG. 3 is a graph of the impact strength of the improved fabric and resin construction as compared to fiberglass only construction.

While the invention will be described in connection with the preferred embodiment, it will be understood that I do not intend to limit the invention to that embodiment. On the contrary, I intend to cover all alternatives, modifications and equivalents as may be included within the spirit and scope of the invention as defined by the appended claims.

DESCRIPTION OF THE PREFERRED EMBODIMENT

Figure 1:
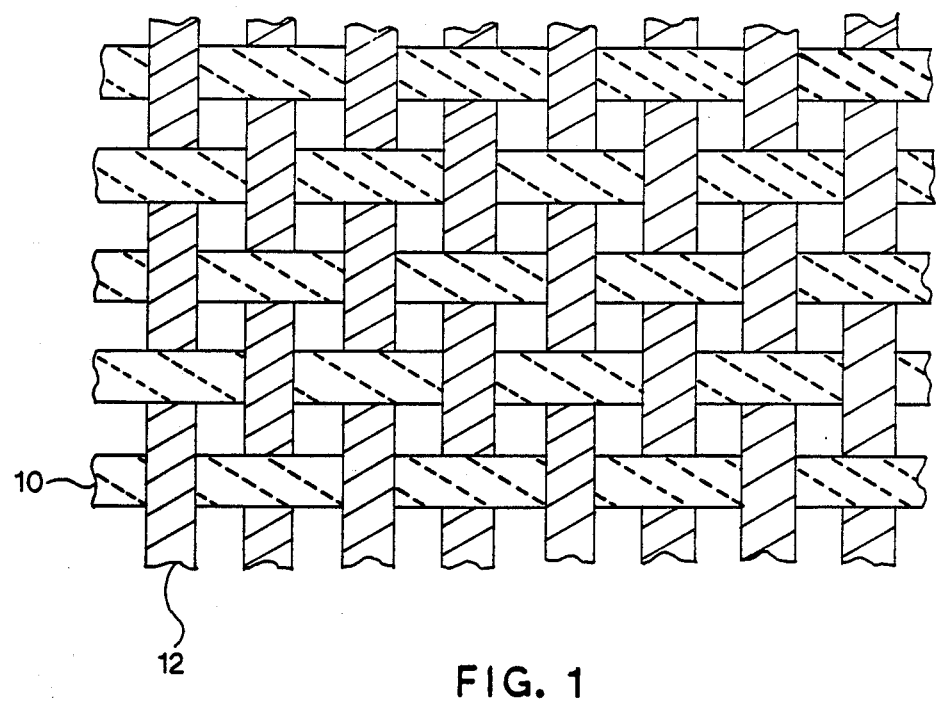
FIG. 1 is a plan view of the fabric of the present invention.

Turning first to FIG. 1 there is shown the fabric of the preferred embodiment of the present invention comprising yarns of fiberglass fibers 12 interwoven with yarns of organic fibers 10, which in the preferred embodiment are polyester fibers. The organic fibers, having more yield, give the finished product some flexibility along the direction of the organic fibers while retaining rigidity with the fiberglass fibers. Polyester fibers are generally available under the trade name Compet from Allied Corp, and other organic fibers, such as nylon, also yield acceptable properties. The weave shown in FIG. 1 is a basic over/under weave, known as a plain weave, and is used in the preferred embodiment but may be varied to suit specific needs without deviating from the scope of this invention.

Figure 2:
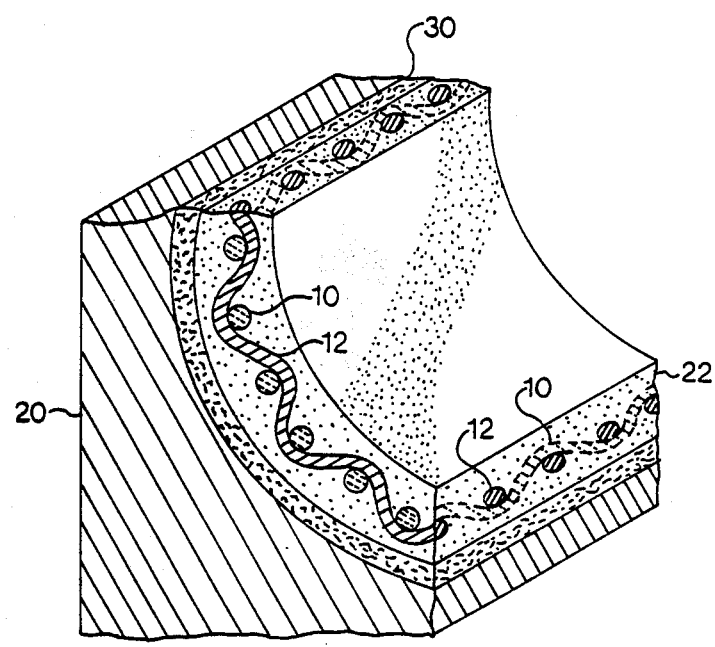
FIG. 2 is a cutaway perspective view of the molded fabric and resin construction of the present invention.

The construction process of the present invention generally involves a mold 20 arranged to receive the fabric and resin combination. The fabric is positioned within the mold, as shown in FIG. 2 with the polyester fibers aligned along the direction of desired flexibility, and is then wetted with resin. The resin material, commonly known in the art, is a liquid plastic which solidifies when mixed with a chemical hardener. Common types used in the industry are referred to by the trade names Polyester, Vinylester, and Epoxy. For ease in description, the term resin as used herein shall mean the mixture of resin and hardener. To complete the construction, this formed fiber and resin composition is allowed to harden and is then removed from the mold.

When tested for impact strength, a fiber and resin construction incorporating polyester fibers according to the present invention shows considerable improvement in impact resistance as compared to a fiber and resin construction incorporating only fiberglass fibers. FIG. 3 is a graph of the impact load withstood by an all fiberglass construction versus a polyester/fiberglass composition manufactured in accordance with this invention. Beyond about 15 cycles it is apparent that the polyester/fiberglass composite will withstand considerably more load before fatiguing. When the same materials were tested for impact penetration, the polyester/fiberglass composite withstood over twice the number of cycles before penetration.

In further embodiments of the present invention, numerous alternatives become feasible. The polyester and fiberglass fibers may be intermixed to achieve limited flexibility in the direction of the polyester fibers. Similarly, some polyester fibers may be run in each direction to provide specific flexibility in each direction. Whichever polyester/fiberglass composite fabric is used, the manufactured product may consist of one or more layers of the composite fabric or may be combined with fiberglass fabric or any equivalent thereof. Moreover, a foam plastic sheet may be incorporated into the laminate to provide increased stiffness and improve structural integrity.

In a specific application of the present invention, the mold 20 would comprise a cavity substantially in the shape of a panel or boat hull having curvature in at least one direction as shown in FIG. 2. A first layer of resin 30 is applied to the mold and allowed to set up. Next a layer of fabric comprised of polyester and fiberglass in a plain weave as shown in FIG. 1 is fitted within the mold and wetted with resin. The fabric is aligned such that the polyester fibers extend longitudinally of the hull and the fiberglass fibers extend transversely (along the curvature). Finally, for additional stiffness, a foam sheet and/or a fiberglass fabric may be fitted within the mold and saturated with resin (this is optional and is not shown in the drawings). This laminate is allowed to harden and the finished boat hull is removed from the mold.

While the fiber and resin composition of the described invention functions in a flat sheet by providing greater yield in one direction the curved panel or hull produced as above described, by use of the curved mold, enhances the properties. By placing the fiberglass fibers transversely as stiff curved ribs in the panel and the polyester fibers longitudinally for flexibility, as is described with the boat hull, a panel is produced which is longitudinally flexible and transversely stiff.

I claim:

1. A panel structure of fiber and resin construction comprising: a panel of fabric arranged to exhibit a curved contour comprising a plurality of glass yarns and a plurality of yarns of organic composition aligned substantially transverse to said glass yarns and interweaved therewith; and a hardenable resinous composition arranged to encompass said yarns to yield a hardened unified stiff panel structure.

2. The construction of claim 1 wherein said glass yarns also comprise some fibers of organic composition and wherein said organic yarns also comprise some fibers of glass composition.

3. The construction of claim 2 wherein said yarns of organic composition are comprised of polyester fibers.

4. The construction of claim 1 wherein said yarns of organic composition are comprised of polyester fibers.

5. A stiff panel structure of fiber and resin construction comprising: a laminate of panels of fabrics arranged to exhibit curved contour wherein at least one of said fabrics is comprised of a plurality of glass yarns and a plurality of yarns of organic composition aligned substantially transverse to said glass yarns and interweaved therewith; and a hardenable resinous composition arranged to encompass said yarns and fabrics to yield a hardened unified stiff panel structure.

6. The construction of claim 5 wherein said glass yarns also comprise some fibers of organic composition and wherein said organic yarns also comprise some fibers of glass composition.

* * * * *